(12) United States Patent
Mellow et al.

(10) Patent No.: US 8,879,771 B2
(45) Date of Patent: Nov. 4, 2014

(54) APPARATUS AND METHOD FOR SOUND REPRODUCTION

(75) Inventors: Timothy J. Mellow, Farnham (GB); Leo Mikko Johannes Karkkainen, Helsinki (FI); Zoran Radivojevic, Cambridge (GB); Koray Ozcan, Farnborough (GB)

(73) Assignee: Nokia Corporation, Espoo (FI)

( * ) Notice: Subject to any disclaimer, the term of this patent is extended or adjusted under 35 U.S.C. 154(b) by 1116 days.

(21) Appl. No.: 12/798,732

(22) Filed: Apr. 8, 2010

(65) Prior Publication Data

US 2011/0248935 A1    Oct. 13, 2011

(51) Int. Cl.
  H04R 1/02    (2006.01)
  G06F 1/16    (2006.01)
  H04N 5/64    (2006.01)
  H04R 25/00   (2006.01)

(52) U.S. Cl.
  CPC .............. *G06F 1/1688* (2013.01); *H04N 5/642* (2013.01); *G06F 1/1605* (2013.01)
  USPC ............................ 381/388; 381/173; 381/191

(58) Field of Classification Search
  USPC ......... 381/306, 333, 388, 173, 174, 190, 191; 455/350, 351, 550; 345/108
  See application file for complete search history.

(56) References Cited

U.S. PATENT DOCUMENTS

| | | | |
|---|---|---|---|
| 6,427,017 B1 | 7/2002 | Toki | 381/190 |
| 6,785,393 B2 * | 8/2004 | Lipponen et al. | 381/191 |
| 6,791,519 B2 * | 9/2004 | Aarts et al. | 345/87 |
| 7,372,110 B2 | 5/2008 | Hatano | 257/379 |
| 2003/0002697 A1 * | 1/2003 | Mellow | 381/190 |
| 2005/0226455 A1 | 10/2005 | Aubauer et al. | 381/388 |
| 2006/0012559 A1 | 1/2006 | Kang | 345/108 |
| 2008/0085019 A1 | 4/2008 | Wagenaars et al. | 381/152 |
| 2008/0152172 A1 * | 6/2008 | Matsuzawa | 381/116 |

FOREIGN PATENT DOCUMENTS

| | | |
|---|---|---|
| EP | 1 617 703 A2 | 1/2006 |
| EP | 1 827 057 A2 | 12/2006 |
| EP | 1 912 469 A1 | 4/2008 |

(Continued)

OTHER PUBLICATIONS

"On the forces in single-ended and push-pull electret transducers", Tim Mellow, et al., J. Acoust. Soc. Am. 124(3), Sep. 2008, pp. 1497-1504.

"On the sound field of a circular membrane in free space and an infinite baffle", Tim Mellow et al., J. Acoust. Soc. Am. 120(5), Nov. 2006, pp. 2460-2477.

(Continued)

*Primary Examiner* — Curtis Kuntz
*Assistant Examiner* — Sunita Joshi
(74) *Attorney, Agent, or Firm* — Harrington & Smith

(57) ABSTRACT

In an embodiment an apparatus includes a graphical display panel and a loudspeaker. The panel has a display layer for displaying images and defines a plurality of apertures penetrating through at least the display layer. The loudspeaker includes a diaphragm arranged substantially parallel to the display layer. Sound from the loudspeaker diaphragm is directed outside a host device through the apertures. The speaker may be an electret or a piezo-electric speaker for thinness. There may be apertures on an opposed side of the host device housing to achieve a dipole pattern which is directed and gives acoustic privacy to the user, or a rear acoustic cavity for a monopole pattern which more broadly disperses the sound. One illustrated embodiment is selectable between monopole and dipole. Size and total area of the holes determines acoustic resistance and so a method is described to determine those from physical parameters of the display panel.

17 Claims, 8 Drawing Sheets

(56) References Cited

FOREIGN PATENT DOCUMENTS

| | | |
|---|---|---|
| GB | 2 360 901 A | 3/2000 |
| JP | 2-76400 A | 3/1990 |
| JP | 2007-300578 A | 11/2007 |
| WO | WO-2006/038176 A1 | 4/2006 |
| WO | WO-2009/017278 A1 | 2/2009 |

OTHER PUBLICATIONS

"Self-Assembled Inorganic Micro-Display on Plastic", Ehsan Saeedi et al., IEEE, Jan. 2007, pp. 755-758.

"Casio, 2.5" LCD with integrated speaker", TechJapan, Sep. 2005, http://www.techjapan.com/PrintArticle1132.html; 2 pgs.

* cited by examiner

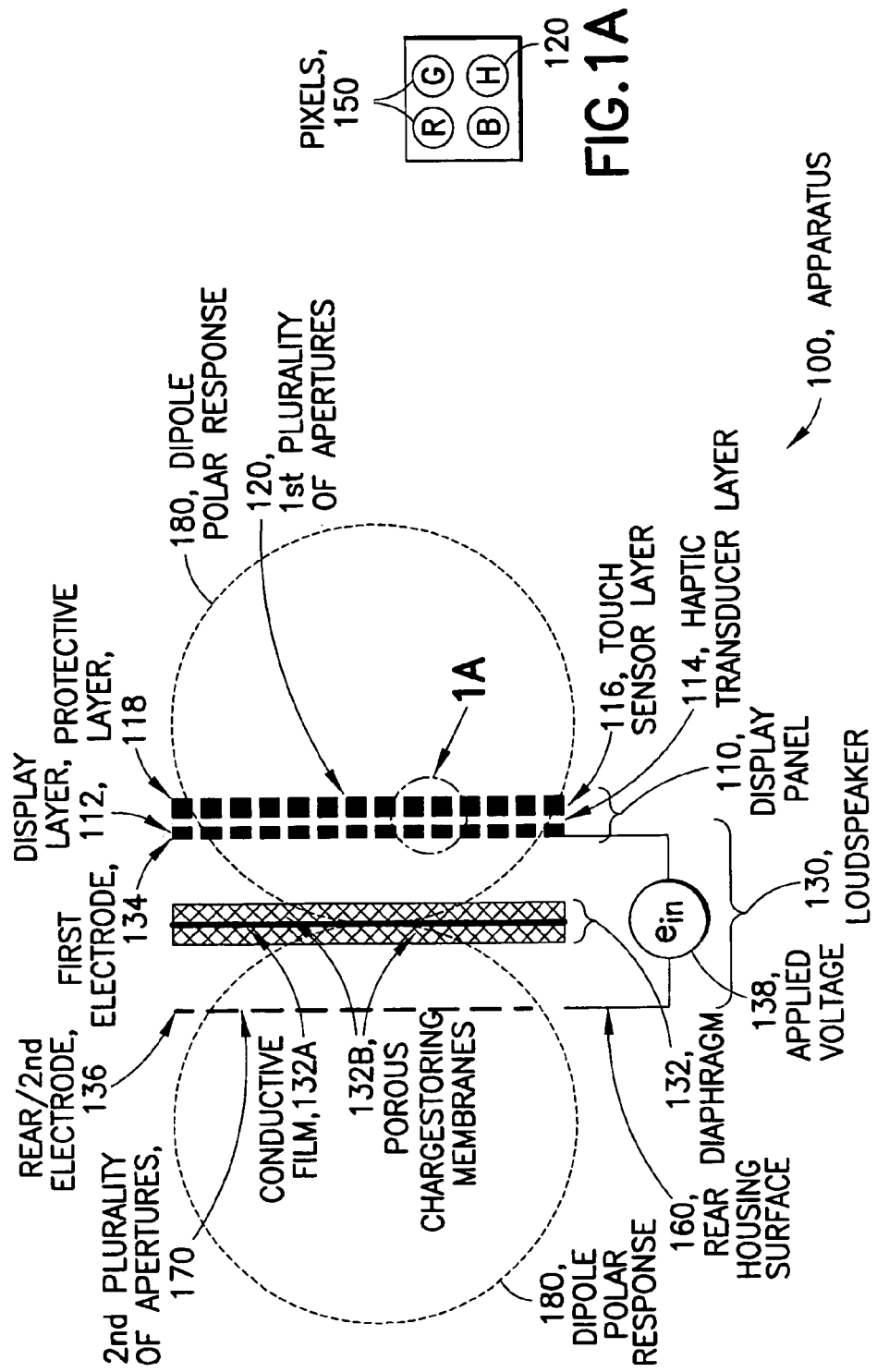

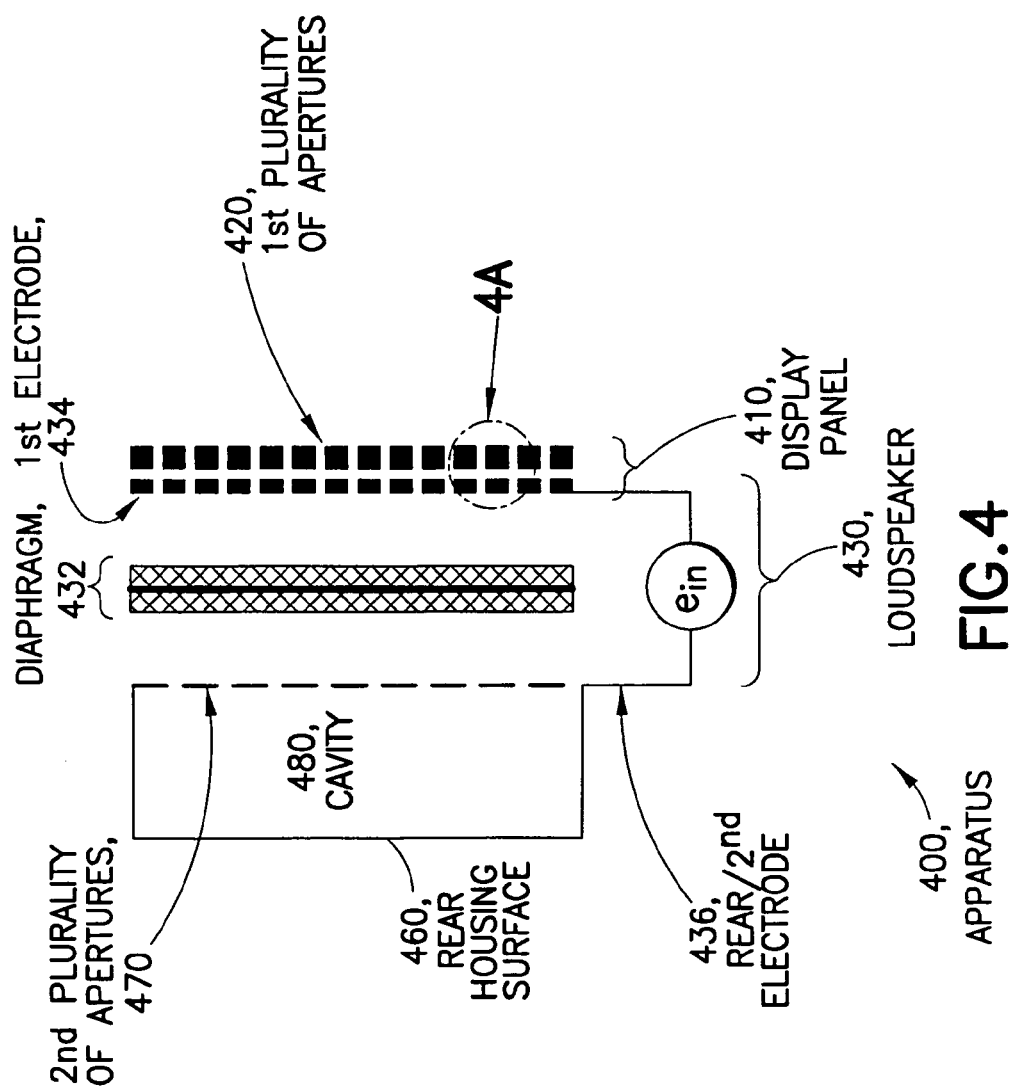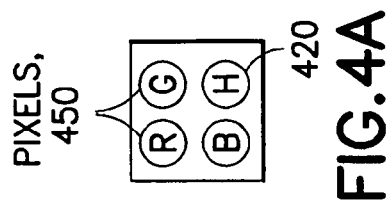

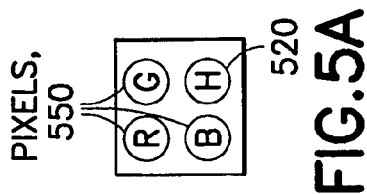
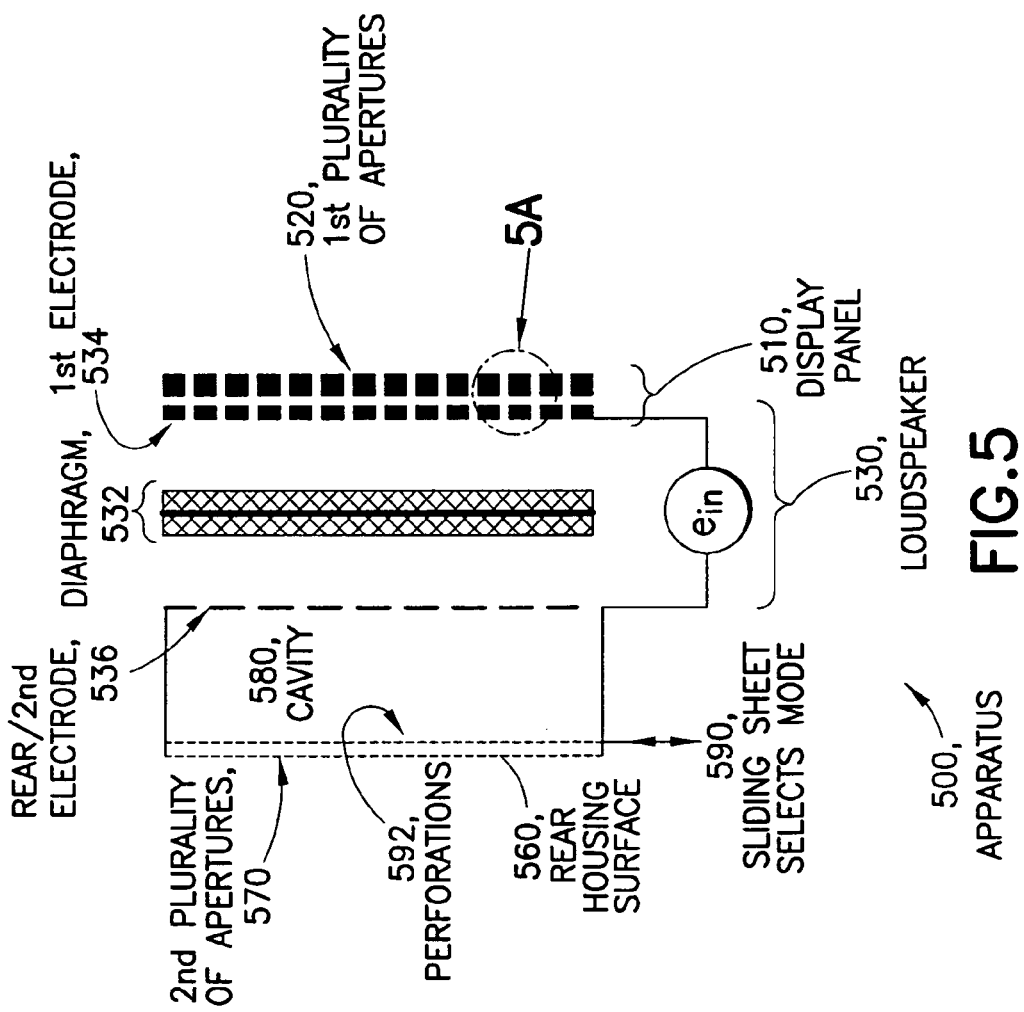

APPARATUS AND METHOD FOR SOUND REPRODUCTION

TECHNICAL FIELD

The exemplary and non-limiting embodiments of this invention relate generally to audio transducers/loudspeakers combined with a graphical display panel, such as may be present in a portable music device or wireless radio as well as larger consumer electronics devices such as televisions and desktop/laptop personal computers.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The consumer products industry is driven, particularly for portable products like mobile phones, toward thinner designs and larger displays which enable more information to be viewed. Traditionally this resulted in reducing loudspeaker size to enable a larger display, in accord with general customer preferences. There appears to be short term technology stagnation in electroacoustics. Further size reduction of existing loudspeaker types is seen to be at the cost of performance, which in many current products is adequate only for speech.

In developed countries hand-portable devices are being used for music applications and so there is a desire for greater dynamic response from the loudspeaker (IHF mode). Additionally, mixed media communication in which one party sends the other visual information while discussing it verbally on the phone drives a need for better sound fidelity in IHF mode, since placing the handset against one's ear prevents the user from simultaneously viewing the display. Many users do not routinely carry an earpiece or headphones.

In developing countries the mobile phone is typically used in IHF mode so that whole families can simultaneously converse with friends and relatives over a single phone or listen to music through its IHF speaker. External loudspeakers such as in a docking station are often impractical in some developing countries since sometimes there is no main power available and mobile phones are recharged using solar panels or hand cranked generators. The various considerations outlined above show there is a motivation to achieve good sound quality from mobile phones in IHF mode without increasing phone size, and without drawing excessive battery power.

Integrating a loudspeaker into a handheld electronic product is usually difficult because loudspeakers are not modular. A good quality sound emitter in current technologies requires size and space, which often conflicts with miniaturization trends in portable consumer electronics. Different models will allow resonant cavities of varying sizes and shapes and so there is little if any design re-use across different products. Consumers favor the largest possible display screen which often results in the end product exhibiting a compromised audio quality, for example where sound is routed through the back or out of the side of the housing to avoid the large LCD screen. Many current mobile phone models exhibit acoustical efficiency less than 0.1%.

There are certain prior art approaches for integrating a visual display with a loudspeaker. For example, one approach by NXT uses an optically transparent speaker having a clear panel driven from the edge by piezo-electric actuators. This approach is seen to work only with large panels where the vibration modes are so dense that in theory the listener does not notice them. In mobile products, the panel is small and so frequency response is poor while distortion is high. The NXT approach uses a piezo-electric shaker that also appears too large for portable product designers. One small-screen adaptation of the NXT approach is "TECHJAPAN: CASIO 2.5 LCD WITH INTEGRATED SPEAKER" (http://techjapan.com/modules.php?op=modload&name=News&file=articel&sid=1132, last visited Mar. 18, 2010).

Other references that detail other techniques and/or background information that might be relevant to these teachings include:

SELF ASSEMBLED INORGANIC MICRO-DISPLAY ON PLASTIC, by Ehsan Saeedi, Samuel S. Kim, and Babak A. Parviz (*MEMS* 2007, Kobe Japan, 21-25 Jan. 2007);

International publication numbers WO 2009/017278 and WO 2006/038176;

European Patent Applications EP 1912469 and 1827057;

Japanese Patent Publication numbers 2007-300578 and 2-76400;

UK Patent Application GB 2360901; and

U.S. Pat. No. 7,372,110 and US Patent Application Publication number US 2005/0226455.

SUMMARY

The foregoing and other problems are overcome, and other advantages are realized, by the use of the exemplary embodiments of this invention.

In a first aspect thereof the exemplary embodiments of this invention provide an apparatus comprising a graphical display panel and a loudspeaker. The graphical display panel comprises a display layer for displaying images, and defines a plurality of apertures penetrating through at least the display layer. The loudspeaker comprises a diaphragm arranged substantially parallel to the display layer.

In a second aspect thereof the exemplary embodiments of this invention provide a method for making apertures or holes in the graphical display panel noted above. In this second aspect of the exemplary embodiment of the invention the method comprises: determining a desired acoustic resistance; using physical parameters of a graphical display panel and the desired acoustic resistance to determine a surface area of the graphical display panel to be occupied by a plurality of holes and to determine a radius of the holes. Further, the method comprises controlling a computer to form the holes, in each of a plurality of graphical display panels that each define the physical parameters, such that the formed holes define the determined radius and occupy the determined surface area of the graphical display panel.

In a third aspect thereof the exemplary embodiments of this invention provide a computer readable memory storing a program of computer readable instructions that when executed cause the computer to perform actions comprising: determining a desired acoustic resistance; using physical parameters of a graphical display panel and the desired acoustic resistance to determine a surface area of the graphical display panel to be occupied by a plurality of holes and to determine a radius of the holes; and forming the holes, in each of a plurality of graphical display panels that each define the physical parameters, such that the formed holes define the determined radius and occupy the determined surface area of the graphical display panel.

These and other aspects of the invention are detailed with greater particularity below.

BRIEF DESCRIPTION OF THE DRAWINGS

FIG. 1 along with inset FIG. 1A is a schematic sectional diagram of an exemplary embodiment of the invention, specifically a dipole implementation using an electret membrane.

FIG. 4 along with inset FIG. 4A is a schematic sectional diagram similar to FIG. 1 but showing an exemplary embodiment that is a monopole implementation.

FIG. 5 along with inset FIG. 5A is a schematic sectional diagram similar to FIG. 1 but showing an exemplary embodiment that is selectable between a dipole and a monopole implementation.

DETAILED DESCRIPTION

Figure 2A:
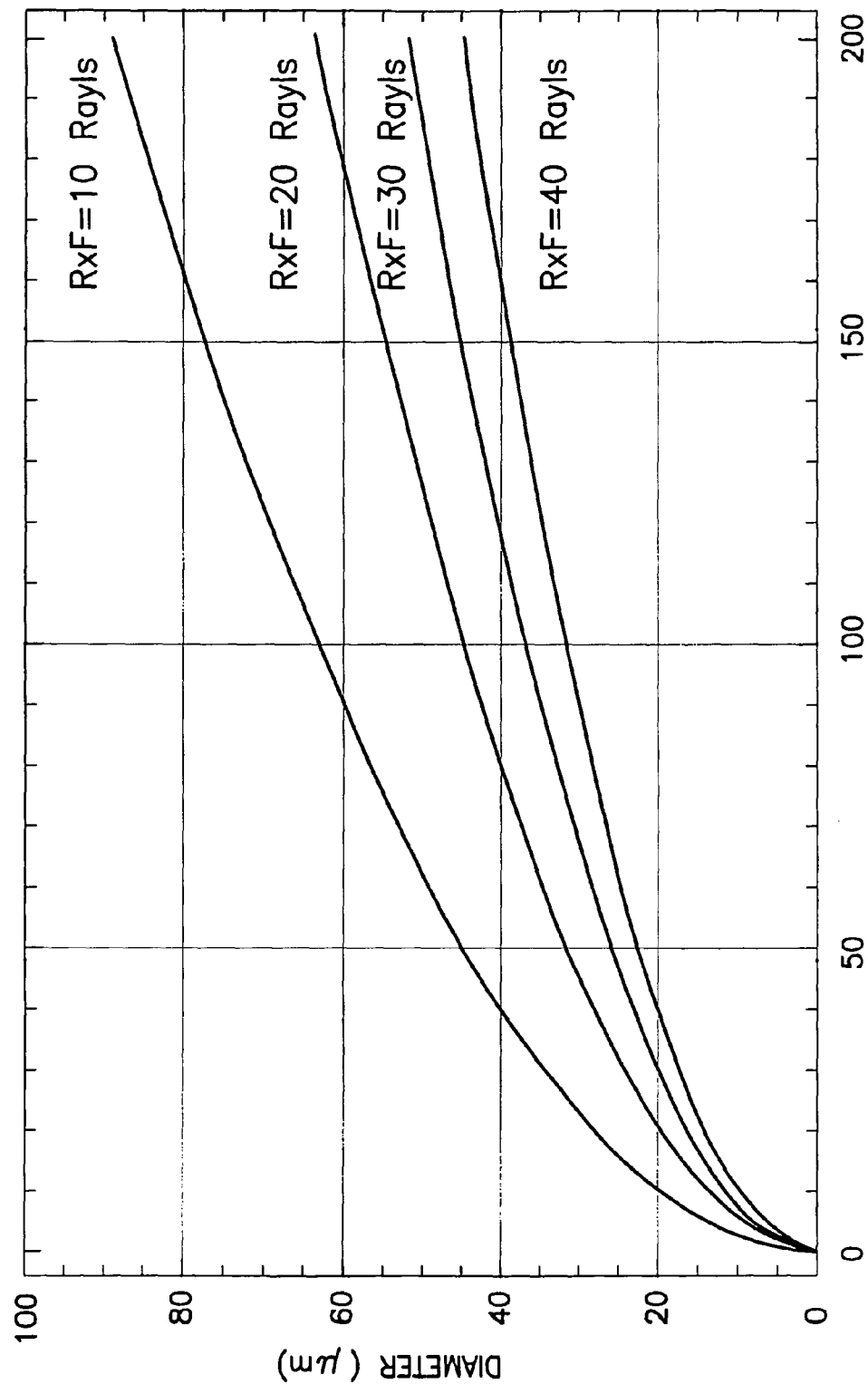
FIG. 2A is a data plot of hole diameter versus hole length for a family of different acoustic resistances, according to various exemplary embodiments of the invention.

Exemplary embodiments of the invention are embodied as a combined loudspeaker and display, with the loudspeaker located behind the display and radiating sound through sound holes or apertures penetrating the display. A particularly advantageous display for use in this manner uses inorganic LEDs that will enable the location of the sound holes or apertures between the pixels. In exemplary embodiments detailed below the holes are smaller than the pixels in order to ensure the sound holes are not visible to the naked human eye. As a specific but non-limiting example, these sound holes/apertures are less than 0.06 mm in diameter on average. By combining the loudspeaker with the display itself, the size of the loudspeaker's diaphragm is no longer forced smaller in deference to size and space constraints arising from user preferences for large displays as noted in the background section above, or due to sound quality being given a low priority by the product designer. In exemplary embodiments described below the diaphragm may occupy an area as large as that of the face of graphical display screen itself, and thereby achieve better sound quality.

The fact that the sound emanates directly from the viewing area additionally provides the user with a more natural audio-visual experience. In a host device where the display is mounted in a flip or lid, there may be sound holes/apertures on both sides of the loudspeaker diaphragm to give a dipole acoustic response. A dipole acoustic response produces zero sound laterally (or in practical systems very little lateral sound), and as detailed further below that sound directionality results in improved audio privacy in public places while in IHF mode. Other exemplary embodiments detailed below use a loudspeaker array, which enable such an arrayed implementation to achieve further directional control using well-known beam-forming techniques on individual ones or groups of the various diaphragms or driving electrodes, as the case may be depending on how the array is implemented.

FIG. 1 is a schematic sectional diagram of an exemplary embodiment of the invention using an electret membrane for the speaker diaphragm, and arranged as a dipole implementation. The apparatus 100 of FIG. 1 includes a graphical display panel 110 and a loudspeaker 130. The graphical display panel 110 is a touch sensitive mule-layer arrangement in the FIG. 1 example, and has a graphical display layer 112 which is the operative layer at which visual images are presented to a user, and a touch sensor layer 116 with haptic transducer layer 114 for converting a user's touch inputs to electrical inputs. Also shown is a protective layer 118 which forms the outward-most surface of the graphical display panel 110, and a conductive layer which forms a first electrode 134 that is a functional component of the speaker 130. The layer forming the first electrode 134 may simply be a conductive coating and the protective layer 118 may simply be a thin film coating.

There is a first plurality of sound holes or apertures 120 which penetrate through the display layer 112 at least, but which are shown as also penetrating the first electrode 134, the haptic transducer layer 114, the touch sensor layer 116 and the protective coating layer 118. In other embodiments one or more of these layers need not be penetrated by the apertures 120, particularly the protective coating layer 118, since in various embodiments these can be made acoustically transparent or nearly so. By example the apertures 120 may have a diameter about 0.06 mm, or some other size so small as to be invisible to the naked human eye.

The inset at FIG. 1A illustrates a frontal view of a small portion of the display panel 110 from the perspective of a user facing it. In this embodiment the display layer 112 is a matrix of pixels in which each pixel is an inorganic light emitting diode 150 each defining an individual color (red R, green G and blue B are shown but additional colors may be present in other embodiments). In other exemplary embodiments the display layer 112 may embody other thin and flexible display technologies, such as organic LEDs as well as recent nano-technology-related display technologies such as by example electro-chromic, electro-phoretic, electro-wetting and other technologies. Disposed between the individual pixels 150 are the individual apertures 120 (denoted H for acustic Hole at inset FIG. 1A). Across the entire area of the display panel 110 the apertures are preferably not in a regular pattern and in an embodiment are randomized across the face of the display panel.

The apertures 120 penetrating the display panel 110 may be prone to trapping dust and dirt, though typically moisture is not an issue because the holes 120 may be made small enough that the surface tension of water prevents droplets from entering. Nanotechnology solutions are currently under development to enable "self-cleaning" materials that repel dirt, and at least one layer of the multi-layer graphical display panel 110 may be made of, or made to incorporate, such a nanotechnology self-cleaning material.

The loudspeaker 130 shown at FIG. 1 includes a diaphragm 132 disposed between the first electrode 134 and a rear or second electrode 136. From FIG. 1 it is clear the apertures 120 extend in the horizontal direction which is perpendicular to the diaphragm 132 and to the layers of the graphical display panel 110 which lay parallel to the diaphragm. As illustrated the second electrode 134 is disposed along a housing of the overall host device in which the apparatus 100 is disposed. In relevant part a rear housing surface 160 is illustrated at FIG. 1 and the rear electrode 136 is disposed along or near the rear of the housing, with appropriate insulating layer or free space therebetween so that a user's hand at that location of the rear housing does not influence voltage 138 across the electrodes 134, 136.

The particular loudspeaker 130 illustrated at FIG. 1 is a push-pull electret transducer (implemented as a speaker at FIG. 1). Push pull electret speakers are generally a transducer in which a specially treated foil electret is sandwiched between two electrodes to form a diaphragm, and arranged so that the electrodes exert forces in opposite directions on the diaphragm. Typically the net force is a linear function of the applied voltage. In the FIG. 1 embodiment the electret material is made one with the diaphragm 132.

As illustrated at FIG. 1 the movement is horizontal, parallel to the direction of the apertures 120 which are all parallel to one another through the display panel. The electret material at the diaphragm 132 of FIG. 1 is simply a dielectric possessing persistent electric polarization (either inherent as when the dielectric is permanently charged, or due to an externally supplied persistent polarization). FIG. 1 illustrates the diaphragm 132 as including a conductive film 132A with a porous charge storing membrane 132B about it. The free space between the diaphragm 132 and the display panel 110 may be quite small, sufficient only to allow vibration of the diaphragm 132 over the desired frequency range (for example, the range of human hearing is generally considered to be 20 Hz to 20 kHz) without the diaphragm 132 contacting any portion of the display panel 110.

Further detail on the exemplary push-pull electret speaker 130 shown at FIG. 1 may be seen at a paper by two of the inventors: "ON THE FORCES IN SINGLE-ENDED AND PUSH-PULL ELECTRET TRANSDUCERS," *J. Acoust. Soc. Am.* 124(3), 1497-1504 (2008)).

The specific embodiment of FIG. 1 is a dipole implementation because the first plurality of apertures 120 through the display layer 112 lie opposite a second plurality of apertures 170 at the rear housing 160, with the diaphragm 132 disposed between them. Ideally these two sets of apertures 120, 170 are aligned with one another to define a plurality of parallel lines (not shown), each passing through the diaphragm 132 and one aperture of each set 120, 170. This makes a dipole implementation because the acoustic response shown generally at FIG. 1 by the two dashed-line circular lobes 180 form a dipole polar response pattern that is symmetric about the diaphragm 132 and that show the directional sound emissions from the electret speaker 130.

Whether for the dipole embodiment as in FIG. 1 or other embodiments detailed below, implementation of the invention is not limited to only electret speakers. While it is seen at the present time that electret speakers may prove to be the most efficient and achieve the best sound quality given the constraints noted above in the background section, in other embodiments the loudspeaker 130 may be implemented as a piezo-electric speaker which can also be made with similar thinness. In certain embodiments the electret speaker might exhibit lower distortion and weaker resonant modes than a piezo-electric speaker.

Electrodynamic speakers need relatively massive magnets, and so are not as thin or light as the other two options noted above. Additionally, the winding resistance of their voice coils wastes a large percentage (99%) of the input power, making them a less practical design choice than either electret or piezo-electric speakers for implementations in which the power supply is galvanic or otherwise limited.

Optimally, the diameter of the small holes/apertures 120 and their population density is selected in such a way that the holes fit into spaces between active pixels 150 on the display 110 and give uniform coverage, on average, across the face of the display panel. For many dipole implementations the rear electrode 136 does not need to have such small holes because it is not used for display purposes and does not need to satisfy high optical requirements, except for example in the case of a flip or slide type phone in which there is an LCD (or other display technology) display on both opposed sides of the diaphragm 132.

In the case of an electret speaker 130, a permanent charge is stored in the membrane 132B, otherwise an external polarizing supply is used as in a conventional electrostatic design. When a suitable drive voltage 138 is applied to the electrodes 134, 136, the polarized membrane 132B is attracted to one or the other of them according to the phase of the input signal. This movement produces a sound that passes through the holes in the electrodes 134, 136. Due to symmetry of the dipole response, there is no sound radiated from the sides where the sound from the back of the diaphragm 132 is perfectly out of phase with that from the front. Some spurious sound may in fact emanate from the sides due to manufacturing imperfections, but this is expected typically to be below the threshold of human hearing.

The size of the holes 120 in the display panel 110 is chosen to provide optimum acoustic resistance for controlling the vibration modes of the membrane 132 and thus achieve a flat frequency response. The relationship between these hole dimensions and resistance is plotted in FIG. 2, and a simulation is shown in FIG. 3.

Figure 3:
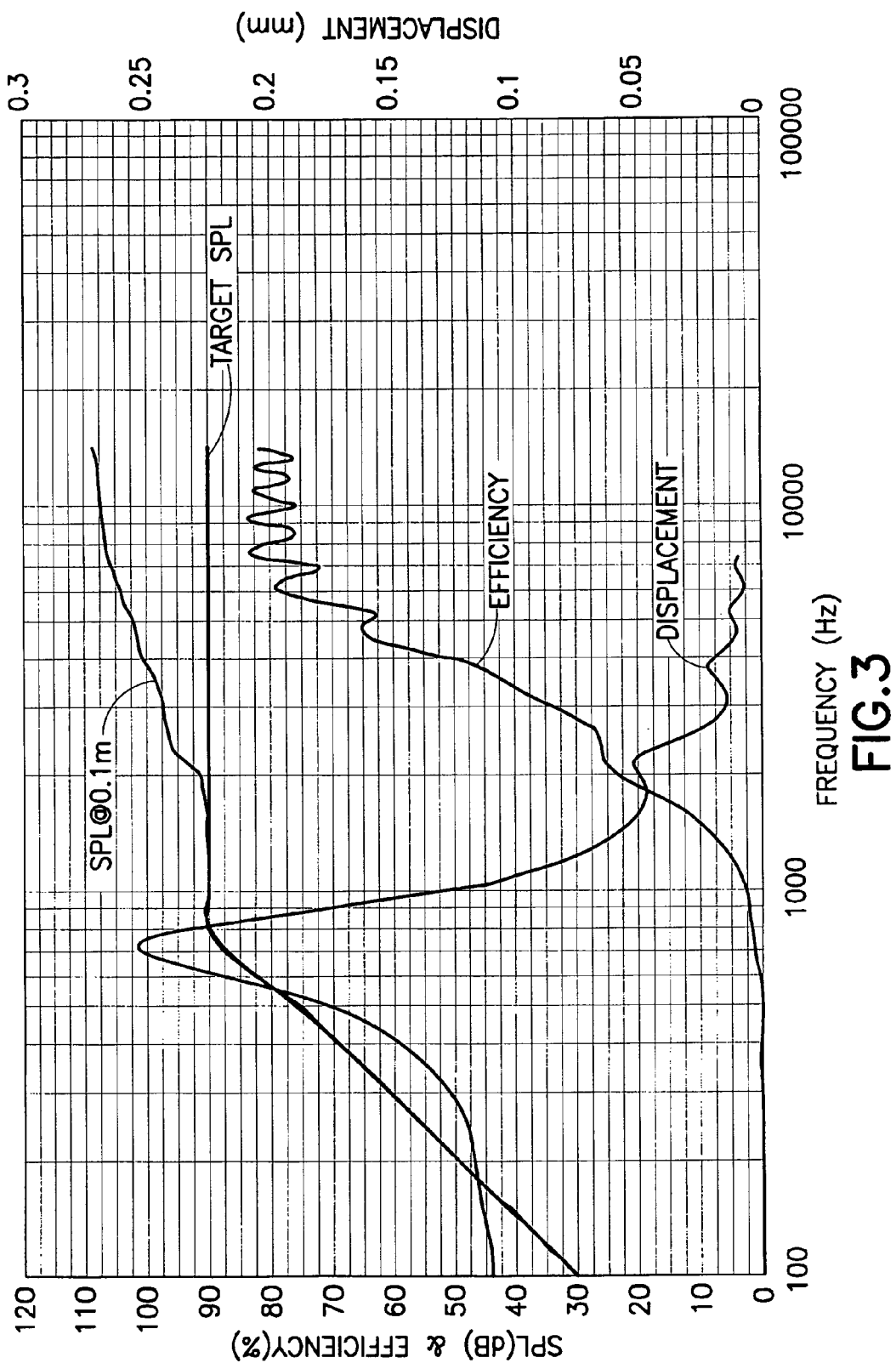
FIG. 3 is a data plot of the exemplary dipole implementation of the invention shown at FIG. 1 showing a minimum size required to meet a specified target performance.

FIG. 2A is a data plot of sound-hole/aperture diameter needed versus hole length through the display panel 110 for a family of different resistances where R is the desired acoustic resistance and F is the fill factor. The fill factor is the ratio of the area occupied by the entrances to the holes to the total display area. In a hexagonal close-packed array, the fill factor is given by:

$$\text{fill\_factor} = \frac{2\pi \times radius^2}{\sqrt{3} \times \text{hole\_pitch}^2}.$$

For example, if the hole pitch is twice the hole diameter, then the fill factor is 0.227 or 22.7%. If the desired resistance is 90 Rayls, then R×F=20 Rayls which is the curve that is second from the top in FIG. 2A. Other plots in FIG. 2 show 10, and 40 Rayls.

Figure 2B:
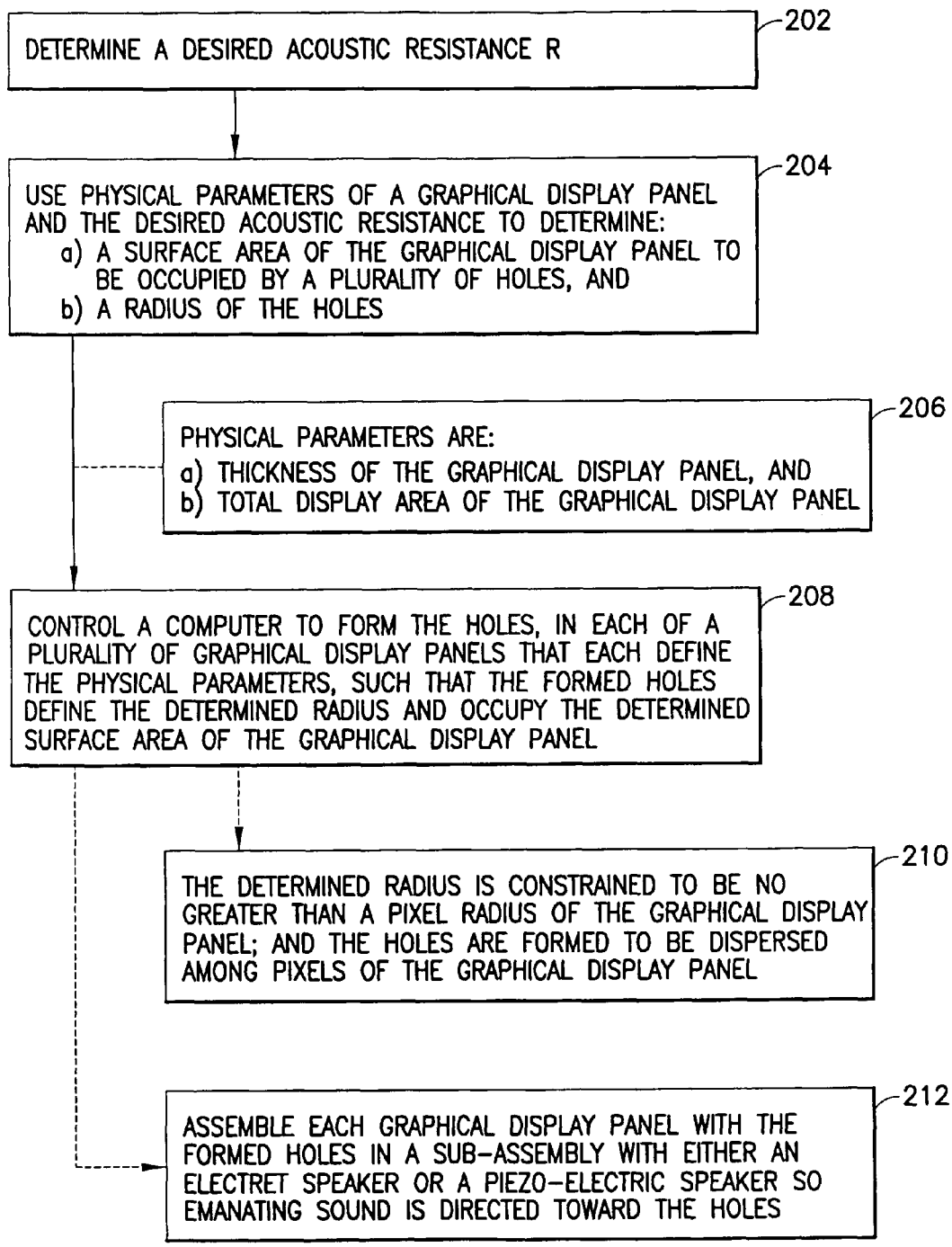
FIG. 2B is a logic flow diagram that illustrates the operation of a method, and a result of execution of computer program instructions embodied on a computer readable memory, to determine number and size of holes according to the data of FIG. 2A so as to make the exemplary physical embodiments of this invention.

FIG. 2B is a logic flow diagram that illustrates the operation of a method, and a result of execution of computer program instructions embodied on a computer readable memory, in accordance with the exemplary embodiments of this invention. FIG. 2B is a more generalized approach than the specific equation above for determining how many and what size holes to make in the graphical display panel. At block 202 the desired acoustic resistance R is determined. By example this may be based on a compromise between the flatness of the frequency response and the maximum sound pressure. At block 204 there is determined, using physical parameters of a graphical display panel and the desired acoustic resistance R, a) a surface area of the graphical display panel to be occupied by a plurality of holes and b) a radius of the holes.

In an embodiment shown at optional block 206 the physical parameters are thickness of the graphical display panel and total display area of the graphical display panel, which is satisfied by the fill-factor equation noted above.

At block 208 the method continues by forming the holes. This is a computer driven process to precisely control the hole formation. Such a computer is not particularly shown but may be a personal computer or a mainframe controlling precision manufacturing/milling equipment as known in the art. The same computation for hole size and number of holes per display panel can be used for making the same display panel multiple times so at block 208 holes are formed in each of a plurality of graphical display panels that each define the physical parameters, such that the formed holes define the determined radius and occupy the determined surface area of the graphical display panel. By example the holes may be formed by laser drilling, mechanical drilling, chemical etching, or similar precision process.

At optional block 210, the determined radius of block 204 is constrained to be no greater than a pixel radius of the graphical display panel, and also forming of the holes at block 208 comprises, according to block 210, dispersing the formed holes among pixels of the graphical display panel. As noted above this dispersal in the formed holes may be random.

At this juncture there is a graphical display panel with the formed holes only, and of course knowledge of the underlying hole size and number of holes which was used to form those holes in the panel. At block 212 the graphical display panels with the holes formed in them are each assembled with either an electret speaker or a piezo-electric speaker as detailed above (or in further embodiments below) such that sound emanating from the speaker is directed toward the holes. This assembly step typically will result in a sub-assembly rather than the display panel and speaker being first combined when placed in the housing of the end-use host device that is ready for retail distribution. Such a sub-assembly may be made directly by the host device manufacturer, or by a component manufacturer who provides such sub-assemblies to the host device manufacturer for final assembly.

The various blocks shown in FIG. 2B may be viewed as method steps, and/or as operations that result from operation of computer program code, and/or as a plurality of coupled logic circuit elements constructed to carry out the associated function(s).

FIG. 3 is a data plot illustrating a simulation of a 40 mm push-pull dipole electret speaker in free space (400 V rms input). This is the minimum size required to meet our target performance. Most graphical displays in new portable consumer products being introduced today are larger than this and so a larger diaphragm area would naturally lead to a better bass response.

The equations used to plot the data of FIG. 3 can be found in a paper by inventors T. J. Mellow and L. M. Kärkkäinen, "ON THE SOUND FIELD OF A CIRCULAR MEMBRANE IN FREE SPACE AND AN INFINITE BAFFLE," *J. Acoust. Soc. Am.* 120(5), 2460-2477 (2006).

FIG. 4 is a schematic sectional diagram of an exemplary embodiment of the invention similar to FIG. 1 but for a monopole implementation. The apparatus 400 of FIG. 4 includes a graphical display panel 410 and a loudspeaker 430. The description of FIG. 1 above gives further details of those elements.

There is a first plurality of sound holes/apertures 420 which penetrate through the display panel 410 and which are preferably randomly dispersed among the pixels as was detailed by example with respect to FIG. 1. The inset at FIG. 4A illustrates three different color pixels 450 with a single aperture 420 (designated H) dispersed among them.

Like the dipole implementation at FIG. 1, the monopole implementation at FIG. 4 has the diaphragm 432 of the loudspeaker 430 disposed between the first electrode 434 and the second electrode 436. But in the monopole implementation illustrated by example at FIG. 4 the second electrode 436 is spaced from the rear housing surface 460 of the housing of the overall host device in which the apparatus 400 is disposed so as to define an acoustic cavity 480. Sound from the rear of the diaphragm 432 is directed toward the cavity 480, whereas sound from the forward direction of the diaphragm 432 is directed outside the host device through the first plurality of apertures 420 that penetrate the display panel 410, and those forward-directed sound waves do not resonate within any enclosed cavity. The resulting acoustic response is not specifically shown but it will form a monopole centered on the display panel side of the diaphragm 432. In other embodiments the acoustic cavity 480 is optional, or if present it need not be airtight, and/or it may be formed by a housing of the host device (for example, host user equipment), and/or it may have other electronic components disposed therein.

In general a piezo-electric or electrodynamic loudspeaker is more suitable for monopole implementations due to the need for a relatively large rear cavity 480, large enough to be acoustically advantageous to the resulting sound heard outside the host device. In certain embodiments the size of that acoustic rear cavity 480 may be reduced by filling it at least partially (or fully if practical) with activated carbon for adsorbing air or some other adsorbing technologies being developed for this purpose. Electret speakers are perfectly suitable for monopole implementations but all else being equal they are seen to give somewhat less acoustic performance on average than a piezo-electric speaker.

FIG. 5 is a schematic sectional diagram of an exemplary embodiment of the invention similar to FIG. 4 but for an embodiment which is selectable between monopole mode and dipole mode. In an embodiment this selectability is by a user who can control the audio privacy afforded by the host device as need be. The apparatus 500 of FIG. 5 includes a graphical display panel 510 and a loudspeaker 530 as with FIGS. 1 and 4, in which the description of FIG. 1 gives further details of those elements.

There is a first plurality of sound holes/apertures 520 which penetrate through the display panel 510 and which are preferably randomly dispersed among the pixels as was detailed by example with respect to FIG. 1. The inset at FIG. 5A illustrates three different color pixels 550 with a single aperture 520 (designated H) dispersed among them.

Like the monopole implementation at FIG. 4, the mode-selectable implementation at FIG. 5 has the diaphragm 532 of the loudspeaker 530 disposed between the first electrode 534 and the second electrode 536, and a cavity 580 defined by the second electrode 536 being spaced from the rear housing surface 560 of the housing of the host device in which the apparatus 500 is disposed. Unlike FIG. 4, the FIG. 5 embodiment has the second plurality of apertures 570 penetrating the rear housing 560 and further includes a perforated sheet 590 which is slide-able relative to the fixed display panel 510. The sheet 590 defines a plurality of perforations 592.

When the sheet 590 is positioned such that the perforations 592 align with the second plurality of apertures 570, then the speaker 530 operates as a dipole acoustic device since sound from the rear of the diaphragm 532 passes through apertures which penetrate the second electrode, through the perforations 592 in the slide-able sheet 590 and through the second set of apertures 570 that penetrate the rear housing 560 and forward directed sound passes out of the host device through the display panel 510. Alternatively, when the sheet 590 is positioned such that the perforations 592 do not align with the second plurality of apertures 570 in the rear housing 560 but rather block them, then the speaker 530 operates as a monopole acoustic device since sound from the rear of the diaphragm 532 has no pathway to pass out of the host device.

This enables the user to select the dipole pattern for greater privacy in a public space since there is little or no lateral leakage of sound, or the monopole pattern for a wider dispersion angle at home. FIG. 5 illustrates the relative sliding as linear but in another embodiment it can be a rotational sliding to selectively align or mis-align the perforations 592 relative to the apertures 570.

A host device embodying a dipole implementation of the invention provides a more directional aspect to the sound emanating from the host device, thereby giving the user a degree of audio privacy. The directional sound dispersion of the dipole mode enhances the user's privacy for audible information similar in concept to the nature of the flat screen display preventing non-users who are too far off-center from being able to read anything visually displayed on the display screen. Those non-users may still be able to hear information spoken by the user, but can only eavesdrop on the half of the conversation that is spoken in their presence rather than hear the entire exchange.

Figure 6A:
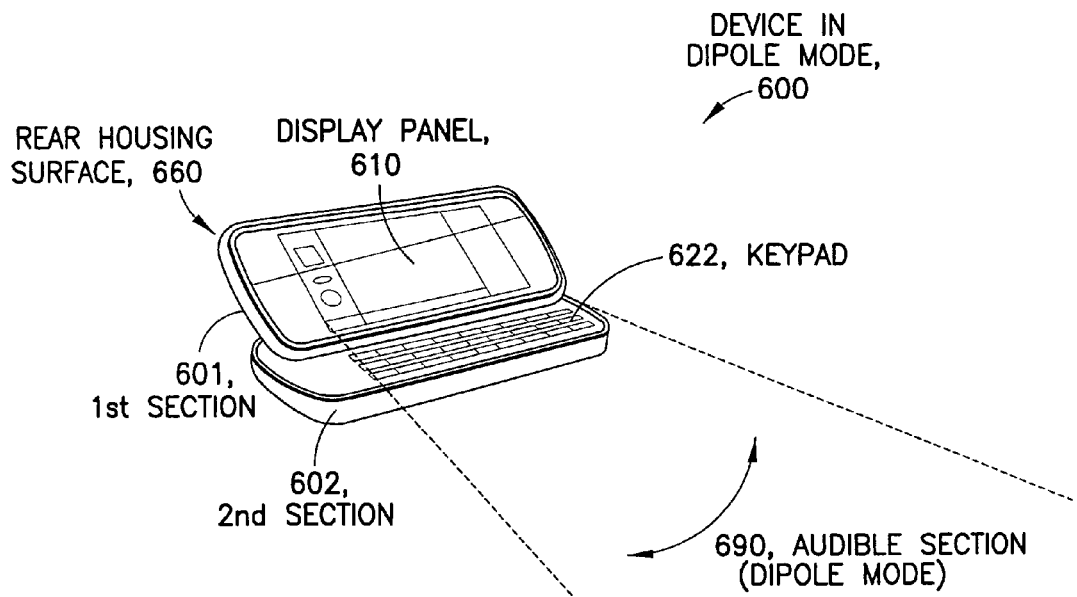
FIGS. 6A-B illustrate conceptually a difference in sound dispersion as between a dipole-mode that provides a user with enhanced privacy of audio information and a monopole mode.

FIG. 6A illustrates one exemplary mobile phone device 600 in the form of a Nokia N97 phone that is adapted according to these teachings to be selectable between dipole mode and monopole mode. The device 600 in the dipole mode of FIG. 6A has a first section 601 that includes a display panel 610 with a first plurality of apertures therethrough, and a second section 602 which has a keypad 622 and by example no audio functionality. The first section 601 defines a rear housing surface 660 through which penetrate a second plurality of apertures. The electret or piezo-electric speaker is disposed within the first section 610 between the display panel 610 and the rear surface 660 with its diaphragm aligned perpendicular to the lengths of the first and second pluralities of apertures, similar to that shown at FIG. 1. When in the open position with the first section 601 rotated relative to the second section 602 as shown at FIG. 6A, the second plurality of apertures are not blocked and so the sound from that speaker disperses according to a dipole pattern such as that shown by circles 180 at FIG. 1. The dipole pattern results in the emanated sound being tightly directional; there is an audible section 690 that defines an acute angle symmetric about a centerline of the diaphragm (and having a vertex located behind the device 600). A person standing within the audible section 690 can hear sound emanating directly from the speaker while simultaneously a person standing outside the audible section 690 cannot.

Figure 6B:
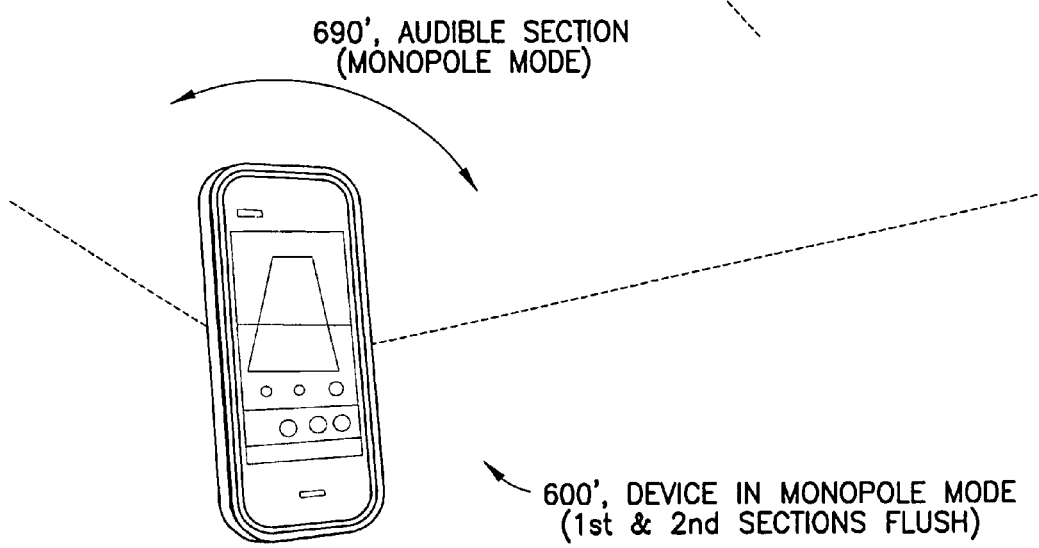

FIG. 6B illustrates the same device 600' but in a monopole mode. The first section 6901 is closed flush against the keypad 622 surface of the second section 602, blocking any sound from emanating from the second plurality of apertures that penetrate the rear housing surface 660. There may be a cavity within the first section 601 behind the diaphragm which becomes resonant when the second plurality of apertures are blocked as in FIG. 6B. When in the closed position with the first section 601 flush against the second section 602 as shown at FIG. 6B, the second plurality of apertures are blocked and so the sound from that speaker disperses according to a monopole pattern in which the emanated sound disperses according to an obtuse angle. A person standing within the audible section 690' of the device 600' in mono-pole mode can hear sound emanating directly from the speaker, but the monopole pattern disperses sound more widely and is more appropriate for non-private matters or as noted in the background section above for where multiple people are involved in a conversation or listening to music from a single mobile station.

FIGS. 6A-B illustrate one particular type of user-selectability as between dipole and mono-pole mode for a single device 600; other implementations can have a simple linear slide between first and second sections (such as in Nokia model N95), a rotatable slide (such as Nokia model 7705 Twist), a hinged or flip relation (either clamshell or folding type, such as Nokia model 7020), or the host device may be implemented as a mono-block phone (such as the Nokia model N900) having a user operable mechanical or electronic actuator that works to slide a perforated sheet as in FIG. 5 that is internal to the mono-block housing that does not have two separate sections.

Exemplary embodiments of the invention may be used to advantage in host electronic devices which have both a graphical display interface and an audio transducer, such as for example handheld portable radio devices (also commonly termed mobile stations or user equipments), portable personal music devices (with or without radio communication capability, such as for example personal digital assistants PDAs or personal music/video devices), personal video recorders which have a graphical display and a loudspeaker to play back recorded and locally stored video with accompanying audio, portable Internet devices, and even audio-visual systems that are mounted in a vehicle such as an automobile.

While automobile sound systems typically include multiple loudspeakers that are physically dispersed through the cabin, often size restrictions imposed on the low frequency woofer due to the cabin layout are the limiting factor fidelity-wise on the bass end of the acoustic spectrum. Since recent trends are toward larger multi-function interactive graphical displays mounted in a vehicle dash, this presents an opportunity to increase bass fidelity via these teachings (particularly the monopole mode) incorporated with that large multi-function graphical display. Often, a large acoustic cavity size directly behind the display screen for a monopole implementation in an automobile can be accommodated without much difficulty in relocating other components. Other exemplary host devices include televisions and personal computers (including special use personal computers such as e-readers), whether desktop or laptop varieties but more advantageously for palmtop and tablet type personal computers which are generally more compact. Embodiments of the invention can also be implemented in digital photo/video display devices to present acoustic information with the visual information that is the digital photograph. Such an implementation can provide surround sound with a displayed image or video, such as for example soothing wave sounds with a video clip of waves lapping against a beach, or a child's own narrative that plays alongside a video or still photo of that same child engaged in a memorable task.

In some such instances the subject matter displayed at the graphical display panel may be unrelated to the audio being output, such as for example a mobile station displaying a map while the loudspeaker plays music or an ongoing voice call. In other instances the subject matter displayed at the graphical display interface may be directly related to the audio being output, such as for example a mobile station displaying a map while the loudspeaker plays turn-by-turn directions, or a music player playing music over the loudspeaker and the graphical display showing dynamic equalizer response or graphical icons/lines that move in rhythm to the music.

Figure 7:
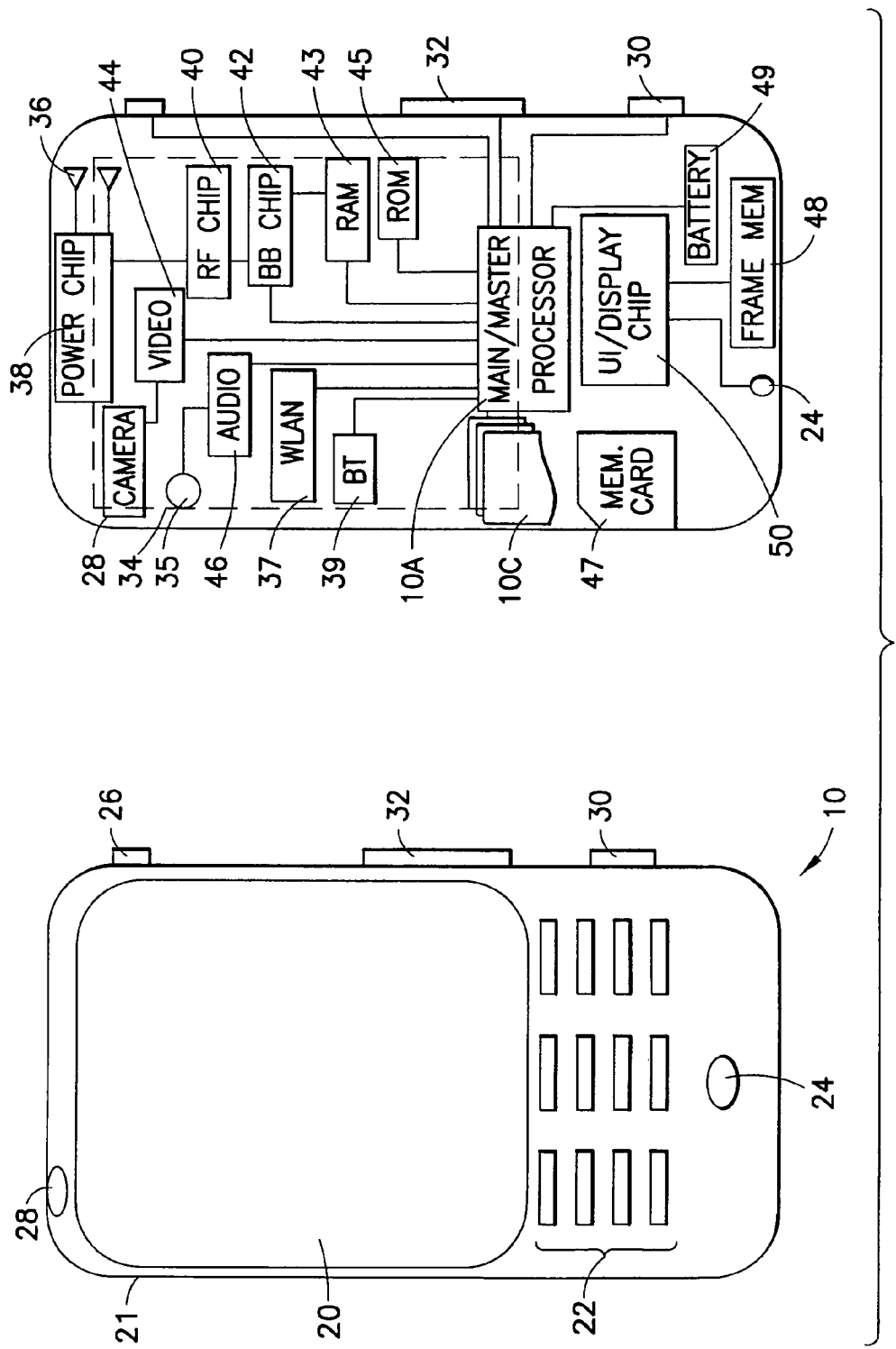
FIG. 7 shows a particularized block diagram of a host portable radio device/user equipment in which exemplary embodiments of the described display/loudspeaker combination might be incorporated.

FIG. 7 illustrates in both plan view (left) and sectional view (right) certain detail of an exemplary host device that is a mobile station/user equipment UE 10. At FIG. 7 the UE 10 has a housing 21 which is typically a plastic shell around or supporting structure for all other components, including a graphical display interface 20 which represents the display panel previously detailed as layered, and a user interface 22 illustrated as a keypad but understood as also encompassing touch-screen technology at the graphical display interface 20 (detailed above as a touch sensor layer with a haptic transducer) and/or voice-recognition technology received at the microphone 24.

A power actuator 26 controls the device being turned on and off by the user. The exemplary UE 10 may have a camera 28, which may be forward facing as shown and/or rearward facing, controlled by a shutter actuator 30 and optionally by a zoom actuator 32 which may alternatively function as a volume adjustment for the loudspeaker when the camera 28 is not in an active mode. The loudspeaker is not fully shown at FIG. 7 but indicated at the sectional view by the dashed outline of a diaphragm 34 driven by an applied voltage 35 across its electrode pair. That applied voltage 35 is controlled by an audio processor 46. For embodiments using a piezo electric loudspeaker, the dashed outline 34 at FIG. 7 represents the piezo-material that moves/vibrates in response to the applied voltage 35 applied directly to that piezo-material.

Within the sectional view of FIG. 7 are seen multiple transmit/receive antennas 36 operating with a ground plane (not shown) that are typically used for cellular communication. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. There may be a separate baseband (BB) chip 42 to detect the signal which is then converted to a bit-stream and finally decoded. Similar processing occurs in reverse for signals generated in the apparatus 10 and transmitted from it.

Shown at FIG. 7 is an image/video processor 44 which encodes and decodes the various image frames from the camera and to the graphical display interface 20. The audio processor 46 controls the varying applied voltage at 35 that in some exemplary embodiments is applied across the electrodes to drive the electret diaphragm 34, or that in other exemplary embodiments is used to drive movement of a piezo-material of a piezo-electric loudspeaker. The audio processor 46 may also process input signals from the microphone 24. The display layer of the graphical display interface 20 is refreshed from a frame memory 48 as controlled by a user interface chip 50 which may process signals to and from the graphical display interface 20 and/or additionally process user inputs from the keypad 22 and elsewhere.

In the embodiment of FIG. 7, the sectional view is behind the plane in which the diaphragm 34 lies though this is but one example arrangement. The diaphragm 34 may be smaller than the whole surface area of the graphical user interface 20 to allow more space interior of the housing 21 for placement of other components. For the case of a host device that exhibits a monopole mode as detailed above, certain of the above-described components may be disposed within the cavity 480, 580. For the case of a dipole mode embodiment, the rear apertures 170, 570 and the perforations 592 in the slide-able sheet 590 may be disposed in planes rearward of the sectional view shown for FIG. 7.

For completeness, the exemplary host device as UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which various executable computer programs 10C are stored. All of these components within the UE 10 are normally powered by a portable power supply such as a battery 49.

The aforesaid processors 38, 40, 42, 44, 46, 50, if embodied as separate entities in a UE 10, may operate in a slave relationship to the main processor 10A, which may then be in a master relationship to them. Any or all of these various processors of FIG. 7 access one or more of the various memories, which may be on-chip with the processor or separate therefrom. Note that the various chips (e.g., 38, 40, 42, etc.) that were described above may be combined into a fewer number than described and, in a most compact case, may all be embodied physically within a single chip.

The computer readable memories may be of any type suitable to the local technical environment and may be implemented using any suitable data storage technology, such as semiconductor based memory devices, flash memory, magnetic memory devices and systems, optical memory devices and systems, fixed memory and removable memory. The processors/chips may be of any type suitable to the local technical environment, and may include one or more of general purpose computers, special purpose computers, microprocessors, digital signal processors (DSPs) and processors based on a multicore processor architecture, as non-limiting examples.

Certain exemplary embodiments of the invention offer the following technical effects. First, a speaker with a larger radiating area can be made in a host device but without increasing the total volume of space inside the host device that is taken up by the speaker. This leads to increased sound quality and efficiency. Currently in many consumer products the drive is to increase the display area and to minimize cover space sound outlets (or "exit wounds" in industrial designer parlance), which results in compromised audio performance. This advantage is particularly useful to improve performance for mobile terminal audio conferencing.

Second, the increased radiating area enables sound to be naturally beamed to the user from the direction that same user perceives the video (for the case in which the audio is related to the video as with video-conferencing), with no special processing. While not particularly shown, the invention may be embodied as a plurality or array of loudspeakers, each similar in structure those individual speakers detailed above but all in combination with a single graphical display panel, or for example in which the array is defined as a single electret/electrostatic speaker with partitioned electrodes. Such an arrayed speaker embodiment can be controlled by computer program software stored on a local memory to manipulate the directional sound behavior in order to make the sound beam pattern narrower or wider, depending automatically upon the application or upon manual user selection. Directional control is particularly advantageous for realistic three-dimensional (or "wide") stereo.

Third, for the case of a dipole implementation certain exemplary embodiments enable improve privacy of audio at low frequencies by virtue of the fact that no sound is transmitted laterally. The dipole embodiments are seen to be most easily implemented in flip-type mobile stations as opposed to monoblocks due to the need for a rear sound outlet and symmetrical acoustic paths on opposed sides of the diaphragm. But such a flip-style dipole implementation can be used quite easily in other classes of consumer products such as laptop personal computers, and also in non-flip style products like desktop flat panel computer displays and televisions where the sound can be ported out freely from both the front and back of the display. Additional advantages may be seen where a personalized audio volume is desirable, such as for example at video displays at individual airline seats so closely spaced passengers can each hear the different programs they're viewing without the need for headsets/earphones. Similar advantage can be used in an automobile application in which there are multiple monitors for passengers.

Fourth, embodiments using an electret type speaker offer the technical advantage of high efficiency, low distortion, flat frequency response and the ability to form an array from a single speaker by simply partioning the electrodes into an array as noted above. The absence of a massive magnet driving the diaphragm as in a traditional loudspeaker saves space and eliminates other issues such as disturbing RF circuitry or erasing the magnetic stripe on credit cards. But while electret speakers typically require a relatively high drive voltage, they also operate on extremely small (less than 40 picofarad mainly capacitive load) current and power, facilitating small-space implementation such as handheld products such as mobile phones. Very compact DC voltage converters are commercially available.

Another technical advantage of the combined loudspeaker and display module/panel as detailed in the examples above is that such a module or sub-assembly is much simpler to integrate into an extremely thin end-product. For example, there is some research into mobile phones having the thickness approximately of a credit card. Integrating a prior art magnet-driven loudspeaker into such a thin device is impossible, and is quite difficult for other types of loudspeakers considering the related drive electronics and acoustical cavity necessary to make it operational.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
   a graphical display panel comprising a display layer for displaying images and defining a plurality of sound apertures penetrating through at least the display layer, wherein the display layer comprises a plurality of pixels for displaying the images, and wherein the plurality of sound apertures are disposed among the plurality of pixels; and
   a loudspeaker comprising a diaphragm configured to generate sound and arranged substantially parallel to the display layer such that sound emanates at least from the plurality of sound apertures.

2. The apparatus according to claim 1, in which the loudspeaker comprises a first electrode and a second electrode;
   in which the diaphragm is disposed between the first electrode and the second electrode, and the first electrode is disposed as a layer of the graphical display panel.

3. The apparatus according to claim 2, in which the loudspeaker is a push pull electret speaker and the diaphragm comprises a conductive film with a charge storing membrane.

4. The apparatus according to claim 3, in which the plurality of sound apertures penetrate through the first electrode, and the second electrode defines a second plurality of sound apertures that penetrate the second electrode.

5. The apparatus according to claim 4, in which the second electrode is disposed adjacent to a housing in which the apparatus is disposed, and the second plurality of sound apertures penetrates through the housing such that the electret speaker is enabled to directionally emit sound via a dipole pattern that is symmetric about the diaphragm.

6. The apparatus according to claim 1, in which the loudspeaker is a piezo-electric speaker.

7. The apparatus according to claim 1, in which the loudspeaker is selectable between a dipole mode and a monopole mode.

8. The apparatus according to claim 7, the apparatus further comprising a perforated sheet that is movably mounted relative to the display panel such that the dipole mode is selected when perforations defined by the perforated sheet are aligned with the plurality of sound apertures and the monopole mode is selected when the perforations of the perforated sheet are not aligned with the plurality of sound apertures.

9. The apparatus according to claim 1, in which the graphical display panel further comprises a touch sensor layer arranged to convert touch inputs at the graphical display panel to electrical inputs.

10. The apparatus according to claim 9 in which the plurality of sound apertures penetrate through the touch sensor layer.

11. The apparatus according to claim 1,
    in which the plurality of sound apertures penetrating at least the display layer are disposed among the plurality of pixels randomly.

12. The apparatus according to claim 11, in which each of the pixels comprise an inorganic light emitting diode.

13. The apparatus according to claim 1, in which the diaphragm of the loudspeaker defines an area approximately equal to an area defined by the display layer.

14. The apparatus according to claim 13, in which the loudspeaker comprises an array of diaphragms whose combined area is approximately equal to the area defined by the display layer.

15. The apparatus according to claim 1, disposed within a mobile radio device.

16. The apparatus according to claim 1, disposed within one of an automobile dash-mount display, a television, and a personal computer of the type desktop, laptop, palmtop or tablet.

17. The apparatus according to claim 1 wherein the diaphragm is arranged substantially parallel to the display layer such that sound emanating from the loudspeaker is directed towards the plurality of sound apertures, wherein the plurality of sound apertures are disposed between the plurality of pixels, wherein the loudspeaker is located behind the display panel, and wherein the loudspeaker is configured to radiate sound through the plurality of sound apertures penetrating the display layer.

* * * * *